Dec. 18, 1956 B. D. LOUGHLIN 2,774,867

FREQUENCY MODULATION DETECTOR HAVING
FIXED OUTPUT FREQUENCY CONVERTER

Filed June 14, 1952 2 Sheets-Sheet 1

INVENTOR.
BERNARD D. LOUGHLIN

BY Laurence B. Dodds

ATTORNEY

Dec. 18, 1956 B. D. LOUGHLIN 2,774,867

FREQUENCY MODULATION DETECTOR HAVING FIXED OUTPUT FREQUENCY CONVERTER

Filed June 14, 1952 2 Sheets-Sheet 2

INVENTOR.
BERNARD D. LOUGHLIN

BY Laurence B. Dodds

ATTORNEY

United States Patent Office 2,774,867

Patented Dec. 18, 1956

2,774,867

FREQUENCY MODULATION DETECTOR HAVING FIXED OUTPUT FREQUENCY CONVERTER

Bernard D. Loughlin, Lynbrook, N. Y., assignor to Hazeltine Research, Inc., Chicago, Ill., a corporation of Illinois Application June 14, 1952, Serial No. 293,600

10 Claims. (Cl. 250—20)

GENERAL

Figure 1:
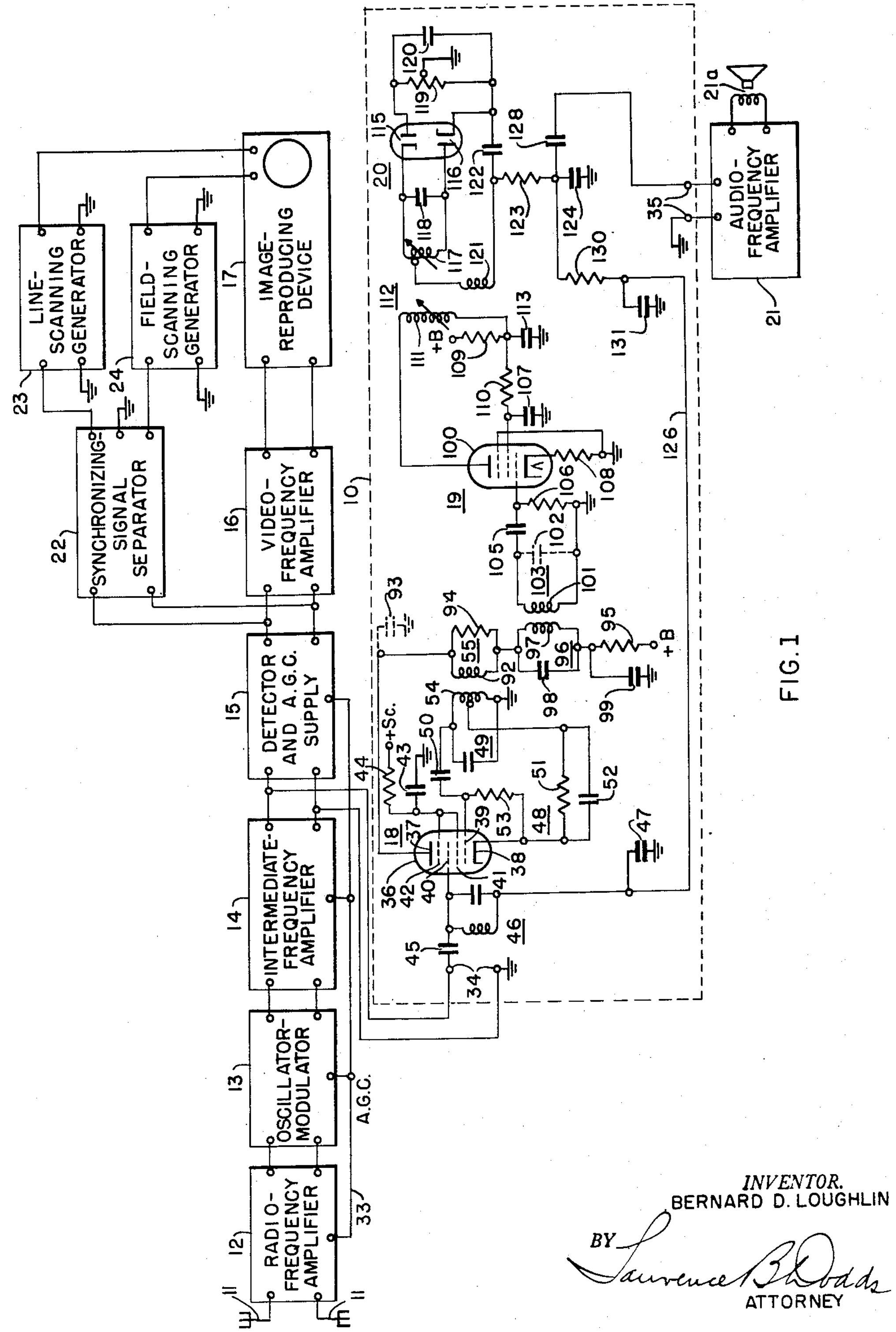

This invention is directed to frequency-conversion apparatus and, more particularly, to frequency-conversion apparatus for converting a frequency-modulated wave signal having a given center frequency to a corresponding frequency-modulated wave signal having a different center frequency. Although such apparatus has a variety of applications, it has particular utility in the sound-signal translating channel of a television receiver and hence initially will be described in that environment.

The present application is a continuation in part of applicant's copending application Serial No. 788,569, filed November 28, 1947, and entitled "Angular-Velocity-Modulated Wave-Signal Receiver," now Patent No. 2,633,527.

The intercarrier sound or carrier difference television receiver possesses a number of advantages over the conventional or so-called "split-sound" television receiver which has caused the manufacture of the former to be rather widespread. An important advantage is that fewer electron tubes and associated circuit components are required in the sound-signal translating channel to accomplish the same general result achieved in the corresponding channel of a conventional television receiver, thus reducing the over-all cost of an intercarrier sound television receiver. Another advantage resides in the fact that the intercarrier sound television receiver is immune to effects of local oscillator drift since a constant 4.5 megacycle difference frequency exists between the received image and sound carrier frequency wave signals, which difference frequency becomes the center frequency of the frequency-modulated sound of intercarrier wave signal applied to the frequency detector of the receiver. Because the intercarrier sound television receiver is not susceptible to oscillator drift, the design of the local oscillator portion of the receiver is ordinarily simpler than that of the local oscillator in a conventional receiver and the fine tuning control is eliminated, thus providing additional savings in receiver costs.

Experience has indicated, however, that the quality of the sound reproduced by an intercarrier sound television receiver operating in the so-called "fringe areas," where the intensity of the received signal is ordinarily rather low, is often impaired by noise to such an extent as to be objectionable to persons being entertained by a received television program. The noise present in the amplitude-modulated video-frequency or image signal is superimposed on the frequency-modulated sound signal by the heterodyning action in the video-frequency detector, and the frequency-detector system in the sound-signal translating channel unfortunately responds to the excessive noise in the applied frequency-modulated signal and supplies it to the loudspeaker. It would be desirable, therefore, that the sound system of a television receiver adapted for operation in a fringe or weak signal area have the better signal-to-noise ratio of the sound-signal translating channel of a "split-sound" type of television receiver while possessing various of the advantages of an inter-carrier sound type of receiver.

It is an object of the invention, therefore, to provide a new and improved frequency-conversion apparatus which has particular utility in the sound-signal translating channel of a television receiver.

It is another object of the invention to provide a new and improved frequency-conversion apparatus which is simple in construction and employs relatively few electron tubes and associated circuit components.

It is a further object of the invention to provide a new and improved combined frequency-conversion and frequency-detection apparatus.

In accordance with a particular form of the invention, a frequency-conversion apparatus comprises an electron-discharge device having an output electrode and a cathode electrode and a plurality of intermediate electrodes including an inner control electrode and an outer control electrode, and an input circuit coupled to a pair of the aforesaid electrodes for supplying a wave signal thereto. The apparatus also includes an oscillator including the cathode electrode and the inner control electrode for developing local oscillations, and a network tuned to approximately the frequency of the aforesaid oscillations and coupled between the output electrode and a point of fixed reference potential and coupled to the oscillator and responsive only to the current of the aforesaid output electrode for supplying to the oscillator a reactive component of current. The frequency-conversion apparatus further includes a network tuned to a predetermined intermediate frequency and coupled between the output electrode and the aforesaid point for translating a beat-frequency wave signal derived by the electron-discharge device. The frequency-converter apparatus also includes a control system coupled to the last-mentioned neswork and to the aforesaid cathode electrode and outer control electrode and responsive to the frequency of the beat-frequency signal for deriving and applying between the last-mentioned electrodes a control signal exerting a first order control effect on the output electrode current flowing to the tuned network and on the aforesaid reactive component of current for varying the operating frequency of the oscillator to maintain the beat-frequency wave signal at substantially the aforesaid predetermined frequency.

For a better understanding of the present invention together with other and further objects thereof, reference is had to the following description taken in connection with the accompanying drawings, and its scope will be pointed out in the appended claims.

Figure 2:
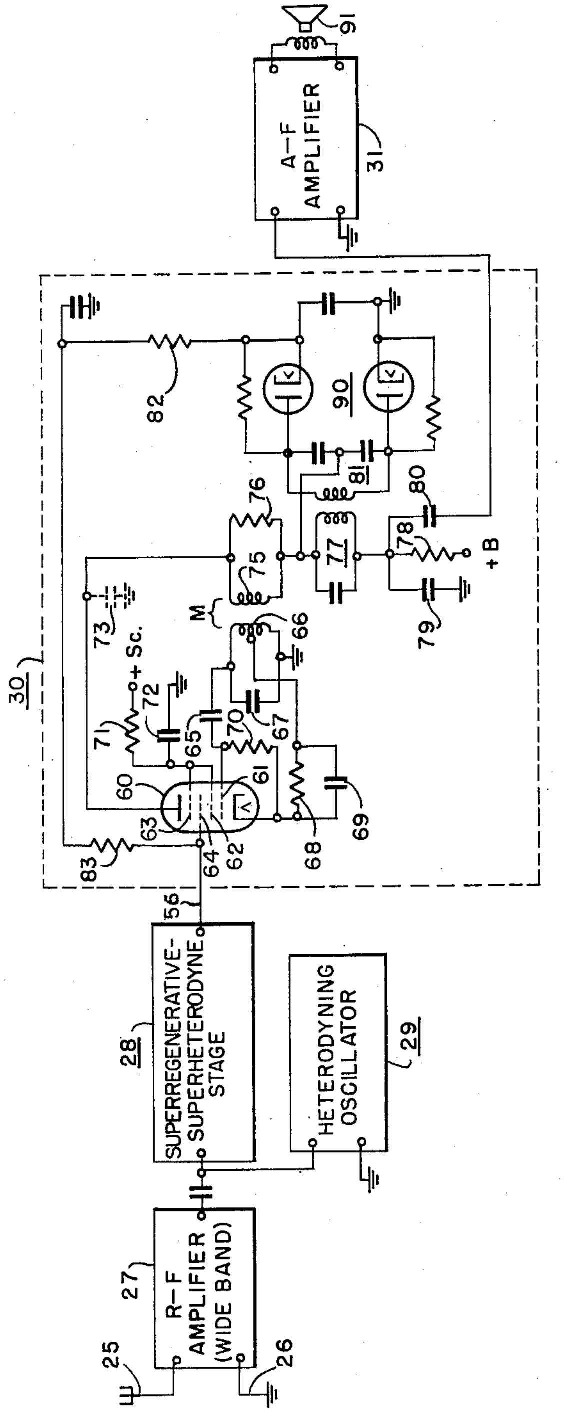

Referring now to the drawings, Fig. 1 is a circuit diagram, partly schematic, of a complete television receiver including a frequency-conversion apparatus in accordance with a particular form of the invention, and Fig. 2 is a circuit diagram, partly schematic, of a frequency-modulated wave-signal receiver including a frequency-conversion apparatus embodying the present invention.

*General description of Fig. 1 receiver*

Referring now more particularly to Fig. 1 of the drawings, the television receiver there represented comprises a receiver of the superheterodyne type, including an antenna system 11, 11 coupled to a radio-frequency amplifier 12 of one or more stages. There is coupled to the latter unit, in cascade, in the order named, an oscillator-modulator 13, an intermediate-frequency amplifier 14 of one or more stages, a detector and automatic-gain-control (AGC) supply 15, a video-frequency amplifier 16 of one or more stages, and a cathode-ray image-reproducing device 17 of conventional construction provided with the usual line-frequency and field-frequency scanning coils (not shown) for deflecting the cathode-ray beam developed in the device 17 in two directions normal to each other. The AGC supply of unit 15 is connected to the input circuits of one or more of the stages 12, 13, and 14 by a control circuit conductor 33. Connected to an output circuit of the intermediate-frequency amplifier 14 is a combined frequency-conversion and frequency-detection apparatus 10 constructed in accordance with the present invention and which comprises in cascade a signal mixer 18, a sound intermediate-frequency amplifier or driver stage 19, and a frequency detector such as a ratio detector 20. The output circuit of the ratio detector 20 is connected to a loudspeaker 21*a* through an audio-frequency amplifier 21.

An output circuit of the detector unit 15 is coupled to the input circuit of a line-scanning generator 23 and a field-scanning generator 24 through a synchronizing-signal separator 22. An output circuit of each of the line-scanning and field-scanning generators 23 and 24, respectively, is coupled in a conventional maner to the line-scanning and field-scanning coils, respectively, of the image-reproducing device 17. The units 10–24, inclusive, with the exception of the signal mixer 18 of the frequency-conversion apparatus 10 which is constructed in accordance with the present invention and will be described in detail hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 11, 11 are selected and amplifier in the radio-frequency amplifier 12 and are applied to the oscillator-modulator 13 wherein they are converted to intermediate-frequency signals. The latter, in turn, are selected and amplified in the intermediate-frequency amplifier 14 and are delivered to the detector and automatic-gain-control supply 15. The image-modulation components of the signal are derived by the detector 15 and are supplied to the video-frequency amplifier 16 wherein they are amplified and then supplied to the beam-intensity-control input circuit of the image-reproducing device 17. A control voltage derived by the automatic-gain-control supply of the unit 15 is applied by the conductor 33 as an automatic-amplification-control bias to the gain-control circuits of units 12, 13, and 14 to maintain the signal input to the detector of unit 15 within a relatively narrow range for a wide range of received signal intensities.

Unit 22 selects the synchronizing signals from the other modulation components of the composite video-frequency signal applied thereto from the detector 15 and also separates the line-synchronizing and the field-synchronizing signals from each other and applies them to respective ones of the generators 23 and 24 to synchronize the operation thereof. An electron beam is produced by the cathode-ray image-reproducing device 17 and the intensity of this beam is controlled in accordance with the video-frequency and control voltages impressed on the brilliancy-control electrode from the video-frequency amplifier 16. Saw-tooth current waves are produced in the line-scanning ad field-scanning generators 23 and 24, respectively, and are applied to the scanning coils of unit 17 to produce scanning fields thereby to deflect the cathode-ray beam of that unit in two directions normal to each to trace a rectilinear pattern on the screen of the tube and thereby reconstruct the translated image.

The signal mixer 18 of unit 10 selects from the output signal of the intermediate-frequency amplifier 14 the carrier-frequency wave signal frequency-modulated by the sound-signal components and converts this modulated wave signal to an intermediate-frequency wave signal which is applied to the driver stage 19 for further amplification prior to its application to the frequency detector 20. The sound-signal components of the applied frequency-modulated wave signal are derived in a conventional manner by the unit 20 and are applied to the audio-frequency amplifier 21 wherein they are amplified and applied to the loudspeaker 21*a* for conversion to sound.

*Description of frequency-conversion apparatus of Fig. 1*

Referring now more particularly to the portion of the receiver embodying the present invention, the frequency-conversion apparatus 10 comprises the signal mixer 18 including an electron-discharge devices or hexode tube 36 having output and cathode electrodes, specifically anode and cathode electrodes 37 and 38, respectively, and a plurality of intermediate electrodes including an inner control electrode 39 and an outer control electrode 40. The tube 36 also includes a first shield or screen electrode 41 between the inner control electrode 39 and the outer control electrode 40, and a second shield electrode 42 connected to the electrode 41 and positioned between the anode 37 and the outer control electrode 40. The two shield electrodes are connected to a fixed potential point or ground through an alternating-current bypass condenser 43 and are also connected to a source +Sc through a resistor 44. The tube 36 further includes an input circuit coupled to a pair of electrodes thereof. This input circuit includes a pair of terminals 34, 34 coupled to the output circuit of the intermediate-frequency amplifier 14, a coupling condenser 45, and a network 46 tuned to the center frequency of the applied sound input signal, for example 21.5 megacycles, and having one terminal thereof connected to the outer control electrode 40 and the other terminal coupled to the fixed reference potential through a coupling condenser 47.

The frequency-conversion apparatus 10 also includes a local oscillator 48 including a parallel-resonant network 49 coupled to the cathode 38 and the inner control electrode 39 for developing local oscillations. The network 49 is tuned to a predetermined frequency, for example, to a frequency of 17.0 megacycles, for developing local oscillations for heterodyning with the 21.5 megacycle signal applied to the outer control electrode 40. One terminal of the network 49 is connected through a coupling condenser 50 to the inner control electrode 39 and the other terminal thereof is connected to the fixed potential point or ground. The cathode 38 of the tube 36 is coupled to the control electrode 39 through a grid-leak resistor 53 and is also coupled to an intermediate point on an inductor 54 of the network 49 through a self-biasing resistor 51 connected in parallel with a condenser 52. The previously described interconnected shield electrodes 41 and 42 complete the circuit of a Hartley-type Class C oscillator.

The frequency-conversion apparatus 10 further includes a network 55 tuned to approximately the frequency of the oscillator 48 and coupled to one of the output electrodes, specifically to the anode electrode, and also to the cathode electrode and to the oscillator for supplying to the latter a reactive component of current. This network includes an inductor 92 inductively coupled to the inductor 54 and tuned to resonance by a condenser 93 shown in broken-line construction since it may comprise in whole or in part the capacitance to ground of the anode electrode of the tube 36. A damping resistor 94 connected in parallel with the inductor 92 heavily damps the tuned network 55 to provide therefor a bandwidth several times that of the deviation range of the frequency-modulated wave signal applied to the input terminals 34, 34. The terminal of the network 55 remote from the anode of the tube 36 is connected to a source of potential +B through a decoupling resistor 95 and a parallel-resonant network 96 which translates the frequency-modulated beat-frequency wave signal derived by the unit 18. The network 96 includes an inductor 97 tuned to a predetermined intermediate frequency such as 4.5 megacycles by a parallel-connected condenser 98. The junction of the resistor 95 and the network 96 is connected to ground through a by-pass condenser 99.

The frequency-conversion apparatus additionally includes a feed-back or control system coupled to the network 96 and responsive to the frequency modulation of the beat-frequency signal developed across the network 96 for deriving a control signal. This control system comprises a frequency-detector system including the cascade-connected driver stage 19 and the frequency detector 20. As previously mentioned, the driver stage 19 is of conventional construction and includes a pentode 100 having in its input circuit a network 103 including an inductor 101 tuned to resonance by a parallel-connected condenser 102 shown in broken-line construction since it may comprise in whole or in part the distributed capacitance of the inductor and the input circuit of the tube 100. The network 103 is inductively coupled to the network 96 and is also resonant at the predetermined intermediate frequency of 4.5 megacycles. The network 103 is coupled to the control electrode of tube 100 through a coupling condenser 105 which is connected to ground through a grid-leak resistor 106. The suppressor electrode of the tube 100 is connected directly to ground while the screen electrode and the cathode are coupled thereto, respectively, through a by-pass condenser 107 and a resistor 108. A source of potential +B is connected to the screen electrode of the tube 100 through voltage-dropping resistors 109 and 110, and is also connected to the anode through the resistor 109 and the primary winding 111 of a transformer 112. A by-pass condenser 113 is connected between the junction of the resistors 109 and 110 and ground.

The frequency detector 20 of the frequency-detector system may be a conventional ratio detector of the balanced type and includes a pair of diodes 115 and 116 connected in series-aiding relationship. The cathode of the diode 115 is connected to the anode of the diode 116 through the center-tapped secondary winding 117 of the transformer 112, this winding being tuned by a parallel-connected condenser 118 to a resonant frequency of substantially 4.5 megacycles. The anode of the diode 115 is coupled to the cathode of the diode 116 through a parallel-connected resistor-condenser network 119, 120 having a time constant substantially longer than the period of the lowest frequency sound-signal component to be derived by the frequency detector 20. The center tap of the resistor 119 is grounded and the center tap of the secondary winding 117 of the transformer 112 is connected to the cathode of the diode 116 through the series combination of a tertiary winding 121, which is closely coupled to the primary winding 111, and through a condenser 122. The junction of the elements 121 and 122 is connected to ground through a de-emphasis network for high-frequency sound signals comprising a series-connected resistor 123 and a condenser 124. The junction of the resistor 123 and the condenser 124 is connected to the input circuit of the audio-frequency amplifier 21 through a coupling condenser 128 and a pair of output terminals 35, 35. The output circuit of the frequency detector 20 of the frequency detector system 19, 20 includes an integrating network comprising a resistor 130 and a relatively large condenser 131 having a time constant which is long with respect to the instantaneous value of the control signal or audio-frequency modulation components derived by the detector 20. One terminal of the resistor 130 is connected to the junction of the resistor 123 and the condenser 124. The other terminal is connected to ground through the condenser 131 and is also connected to the network 46 through the control circuit conductor 126. The purpose of this connection is to complete a feed-back circuit between the network 96 in the output circuit of the mixer and its input circuit.

*Operation of frequency-conversion apparatus 10 of Fig. 1*

In considering the operation of the frequency-conversion apparatus 10, the effect of the output signal developed by the frequency-detector system 19, 20 on the signal mixer 18 will be neglected at the outset and it will be assumed that the tube 36 is operating with a fixed bias on its outer control electrode 40. Space-current flow between the electrodes 38 and 41 of the oscillator 48 periodically produces a related flow of anode current in the anode-cathode circuit of the tube 36. Because of the inductive coupling between the windings 92 and 54, the anode-current flow in the tuned network 55 introduces a reactive component of current in the tuned circuit 49 of the oscillator 48. The magnitude of this reactive component is effective in the well-known manner to vary or control the operating frequency of the oscillator. For the assumed condition of a fixed operating bias and no signal applied to the outer control electrode 40 of the tube 36, the local oscillations developed by the oscillator 48 have a substantially constant frequency.

The tuned network 46 selects the frequency-modulated carrier-wave signal, which has a mean frequency of 21.5 megacycles and a maximum deviation range ±25 kilocycles, from the composite intermediate-frequency signal applied to the terminals 34, 34 from unit 14 and applies the selected signal to the outer control electrode 40 of the tube 36. The frequency-modulated signal applied to the outer control electrode controls the space current flowing to the anode of the tube 36 and the current which arrives at the anode is modulated by both the local oscillator signal and the applied signal just mentioned. The mixing of these two signals in the electron stream of the tube produces a beat-frequency wave signal in the anode current of the tube 36, and the tuned network 96 selects the frequency-modulated heterodyne difference signal centered about the predetermined intermediate frequency of 4.5 megacycles. The frequency modulation of the signal derived in the network 96 follows the frequency excursions of the signal applied to the outer control electrode 40 of the tube 36. The frequency-modulated output signal of the mixer 18 is translated by the network 96 to the similarly tuned network 103 which applies that signal to the control electrode of the tube 100 for amplification therein and translation by the primary winding 111 of the output transformer 112 to the ratio detector 20. The latter derives the modulation components of the applied frequency-modulated wave signal in the well-known manner and the modulation components developed across the condenser 124 are applied by the condenser 128 and the terminals 35, 35 to the unit 21 for amplification therein and application to the loudspeaker 21*a*. The modulation components developed across the condenser 124 comprise a control signal which is integrated by the resistor-condenser network 130, 131 which, as previously mentioned, has a long time constant with reference to the instantaneous value of the derived modulation components or control signal, to develop a control effect representative of the average value of that control signal and thus representative of the average frequency of the applied frequency-modulated wave signal. This control effect is a varying unidirectional potential which is applied by the conductor 126 and the network 46 to the outer control electrode 40 of the tube 36.

Consider now the action of the control effect derived by the frequency-detector system 19, 20 and applied to the tube 36. This control effect constitutes a variable bias and varies the anode-cathode current of the tube 36 in accordance with the frequency deviations of the received signal and thereby varies the magnitude of the quadrature phase or reactive component of current fed back by the broadly tuned network 55 to the tuned network 49 of the local oscillator. This reactive component in turn modifies the operating frequency of the local oscillator 48 so as to maintain the center frequency of the beat-frequency wave signal developed in the network 96 at substantially the desired intermediate frequency of 4.5 megacycles which constitutes the reference frequency of the frequency-detector system 19, 20.

It will be seen, therefore, that the unit 10 including the signal mixer 18 and the frequency-detector system 19, 20 is in the nature of a combined frequency-conversion and frequency-detection apparatus which has particular utility in the sound-signal translating channel of a television receiver for developing a frequency-modulated intermediate-frequency wave signal having a center frequency of 4.5 megacycles as in an intercarrier sound television receiver, and also for deriving the modulation components of the developed intermediate-frequency wave signal. It will also be clear that the unit 18 functions as a combined signal mixer and reactance device having a single electron tube for performing its various functions. It further will be seen that the apparatus 10 is effective to develop in the output circuit of unit 18 a frequency-modulated sound signal which is always substantially centered at 4.5 megacycles as a result of the slow-acting automatic frequency control afforded by units 19 and 20 in conjunction with unit 18, thus providing the important advantages realized in an intercarrier sound type of television receiver.

*Description of frequency-modulation receiver of Fig. 2*

A frequency-conversion and detection apparatus in accordance with the invention also has utility in a frequency-modulation wave-signal receiver of the "sampled" or "pulse-modulated" type. Such receivers are effective to translate a received signal to a frequency-detector system only during recurring pulse intervals of relatively short duration. Accordingly, such receivers may employ superregenerative or superregenerative superheterodyne circuits because of their inherent recurrent type of operation for developing the samples of energy for application to the frequency-detector system of the receiver.

Receivers of the type just mentioned are disclosed and claimed in applicant's previously identified copending application, now Patent 2,633,527, and reference is made thereto for complete descriptions and explanations of the operation of various such receivers. Fig. 6 of the patent discloses a superregenerative superheterodyne receiver which includes a frequency-conversion apparatus in accordance with the present invention wherein the deviations of a frequency-modulated wave signal applied to the frequency-conversion apparatus are crushed by that apparatus to permit the selection of a particular one of the pulse-modulation components to be detected by the frequency detector of the receiver. Fig. 2 of the drawings of the present application is substantially identical with Fig. 6 of the aforesaid patent and corresponding units and circuit elements in the two figures just mentioned are designated by the same reference numerals.

Referring now more particularly to the receiver of Fig. 2 of the drawings of the present invention, an antenna-ground system 25, 26 is coupled to the input circuit of a wide-band radio-frequency amplifier 27. The output circuit of amplifier 27 is coupled to a combined superregenerative superheterodyne stage 28 with which there is associated a heterodyning oscillator 29. A frequency-conversion apparatus and detection apparatus 30, including a fast automatic-frequency-control (AFC) system for crushing the deviations, is coupled to the output circuit of unit 28. Finally, an audio-frequency system including an amplifier 31 and sound-signal reproducing device 91 is connected to the output circuit of apparatus 30.

Briefly, the operation of the Fig. 2 arrangement is as follows. A frequency-modulated wave signal intercepted by antenna system 25, 26 is selected and amplified in radio-frequency amplifier 27 and converted into a pulse-modulated intermediate-frequency signal through the superregenerative superheterodyne function of units 28 and 29. The pulse-modulated intermediate-frequency signal is supplied to apparatus 30 which performs a second conversion and simultaneously detects the modulation components of a selected one of the pulse-modulation components of the intermediate-frequency signal obtained from unit 28. The detected modulation components are supplied to audio-frequency amplifier 31 for further amplification and reproduction by unit 91. The AFC system of apparatus 30 crushes the deviations of the selected pulse-modulation component so that the response of the frequency detector remains substantially only that due to the particular selected component.

The heterodyning oscillator 29 is more fully described in applicant's above-identified patent and the superregenerative superheterodyne stage is described and claimed in applicant's United States Patent 2,588,022, granted March 4, 1952, for "Superregenerative Superheterodyne Wave-Signal Receiver."

*Description of frequency-conversion apparatus 30 of Fig. 2*

The frequency-conversion apparatus 30, which responds to the intermediate-frequency pulse-modulated signal translated by the stage 28, comprises a vacuum tube 60 similar in many respects to the well-known pentagrid converter. It has a cathode, an anode, and at least three intermediate electrodes. As shown, the system of intermediate electrodes includes a first or inner control electrode 61, a pair of interconnected screen electrodes 62 and 63, and a second or outer control electrode 64. The cathode, first control eletcrode 61, and screen electrode 62 are connected to provide a Class C oscillation generator. To this end, electrode 61 is connected through a condenser 65 to a parallel-resonant circuit provided by an inductor 66 and a condenser 67. A self-biasing resistor 68 by-passed by a condenser 69 connects the cathode to a tap on inductor 66 while a resistor 70 is connected directly between the electrode 61 and cathode. Screen electrodes 62 and 63 are connected to a space-current source +Sc through a resistor 71 by-passed by a condenser 72. The described circuit connections constitute an oscillation generator of the Hartley type in the detector.

The anode of tube 60 is connected with a first tuned circuit which is heavily damped for broad-band response. This tuned circuit is provided by an inductor 75 tuned approximately to the resonant frequency of elements 66, 67 by a condenser 73 shown in broken-line construction to connote the capacitance to ground of the anode of tube 60 and damping is accomplished by a resistor 76. Inductors 66 and 75 have a magnetic coupling so that a quadrature-phase voltage component may be supplied from the tuned circuit of the anode to the tuned circuit of the oscillation generator to determine the frequency of the generated oscillations. The second control electrode 64 is connected by way of conductor 56 to the superheterodyne superregenerator 28 so that the intermediate-frequency pulse-modulation components are applied to the detector arrangement 30.

A primary tuned circuit 77 associated with a conventional frequency-modulation detector 90 connects the anode of tube 60 through inductor 75 and a load resistor 78 to a space-current source +B. The tuned circuit 77 is resonant at the heterodyne difference frequency of the mean frequency of the signal applied to control electrode 64 and the signal developed by the Hartley oscillator. Resistor 78 is by-passed by a condenser 79 to constitute the usual de-emphasis filter. The audio-frequency output is derived across load resistor 78 and is supplied through a condenser 80 to the audio-frequency amplifier 31 and its associated loudspeaker 91. A secondary tuned circuit 81 coupled to primary tuned circuit 77 comprises the input circuit of a conventional automatic-frequency-control system and the output of that system is supplied through resistors 82 and 83 to the second control electrode 64 of tube 60.

*Operation of frequency-conversion apparatus 30 of Fig. 2*

In considering the operation of unit 30, the effect of its automatic-frequency-control arrangement will be neglected initially and it will be assumed that the tube 60 operates with a fixed bias on its control electrode 64. The cathode and first two intermediate electrodes along with their associated circuit elements comprise a well-known continuous-wave oscillator. Current flow occurs in the electrode system of the oscillator periodically and occasions a related flow of current in the anode-cathode circuit of tube 60. In view of the coupling of inductors 66 and 75, current flow in the anode-cathode circuit of tube 60 introduces a component of quadrature-phase feed-back voltage into the oscillator. The magnitude of this component, relative to that of the other signal components in the oscillator, determines the oscillating frequency. For the assumed condition of fixed operating biases, the relative amplitudes of the signal components are fixed and, therefore, the oscillator functions at a constant operating frequency.

When a radio-frequency signal is supplied to control electrode 64 of tube 60, as for example the intermediate-frequency output signal of superheterodyne superregenerator 28, electron mixing within the tube effects a conversion which produces a second intermediate-frequency signal, namely, the sum or difference frequency of the output signal of the oscillator section of tube 60 and the signal applied to its control electrode 64 from unit 28. Hence, for the assumed conditions of fixed bias the circuit arrangement of tube 60 constitutes a frequency converter, including its own heterodyning oscillator, and develops an output signal referred to as a second intermediate-frequency signal. The frequency of this output signal follows the frequency excursions of the heterodyned signals and, since unit 28 delivers a frequency-modulated signal to control electrode 64, the output signal of tube 60 is likewise frequency-modulated. The signal output of tube 60 is applied to the frequency-modulation detector 90 including the discriminator circuits 77 and 81. The modulation components are developed in the detector in a conventional manner and are supplied through resistor 82 to control electrode 64 of tube 60 as an AFC potential.

The AFC potential is unidirectional and, as applied to control electrode 64, is analogous to a bias. It is effective to vary the anode-cathode current of tube 60 in accordance with the frequency deviations of the received signal and thereby to vary the magnitude of the quadrature-phase feed-back component to the oscillator section of tube 60. The operating frequency of the oscillator is modified accordingly and as a result the frequency deviations of the anode-cathode current of tube 60 are crushed to remain within the pass band of selector 77, 81 of the AFC system. Obviously, the modulation components of the received signal may be obtained from the detector circuit of the AFC system but, in view of the application of the AFC potential to control electrode 64 of tube 60, the fundamental component of anode-cathode current of that tube also represents the modulation components of the received signal. In Fig. 2, the audio-frequency output is derived across load resistor 78 in the anode-cathode circuit of tube 60 and is delivered to the audio-frequency amplifier 31 for application to the loudspeaker 91 wherein it is converted to sound.

Unit 30, which has been described as a frequency-selective detector, is in the nature of a converter-reactance detector device because electron conversion is realized, a simulated reactance is provided by the quadrature-phase feedback supplied by inductors 66, 75 to effect frequency deviations, and the fundamental component of anode current produces a potential variation representing the detected modulation components.

The primary and secondary selectors 77 and 81 of the AFC system are chosen so that the signal output of the AFC system has sufficient amplitude to accomplish the desired crushing or suppressing of frequency deviations necessary to permit the detector to follow a particular pulse-modulation component of the first intermediate-frequency signal applied thereto from unit 28. In some applications, it may be desirable to have the primary selector 77 a low-Q circuit and the secondary selector 81 a high-Q circuit. Where the Q's of the selectors are related in the manner indicated, an immediate change is observed in the output signal of the AFC system in the presence of a large phase variation between successive pulse intervals. This may be relied upon more effectively to crush the frequency deviations and accommodate phase variations between pulse intervals within the range of ±180 degrees.

By way of illustrating a practical embodiment of the invention, the following circuit-component values are given for various elements of the unit 30:

| | |
|---|---|
| Tube **60** | Type 6BE6. |
| Condenser **65** | 100 micromicrofarads. |
| Condenser **69** | 0.001 microfarad. |
| Condenser **72** | 0.01 microfarad. |
| Condenser **79** | 0.001 microfarad. |
| Inductor **66** | Resonant at 22 megacycles with condenser **67**. |
| Inductor **75** | Resonant at about 22 megacycles with stray capacitance **73**. |
| Resistor **68** | 120 ohms. |
| Resistor **70** | 22,000 ohms. |
| Resistor **71** | 15,000 ohms. |
| Resistor **78** | 22,000 ohms. |
| Resistor **82** | 1 megohm. |
| Resistor **83** | 1,000 ohms. |
| 1st intermediate frequency | 18 megacycles. |
| 2nd intermediate frequency | 4 megacycles. |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A frequency-conversion apparatus comprising: an electron-discharge device having an output electrode and a cathode electrode and a plurality of intermediate electrodes including an inner control electrode and an outer control electrode; an input circuit coupled to a pair of said electrodes for applying a wave signal thereto; an oscillator including said cathode electrode and inner control electrode for developing local oscillations; a network tuned to approximately the frequency of said oscillations and coupled between said output electrode and a point of fixed reference potential and coupled to said oscillator and responsive only to the current of said output electrode for supplying to said oscillator a reactive component of current; a network tuned to a predetermined intermediate frequency and coupled between said output electrode and said point for translating a beat-frequency wave signal derived by said device; and a control system coupled to said last-mentioned network and to said cathode electrode and said outer control electrode and responsive to the frequency of said beat-frequency signal for deriving and applying between said last-mentioned electrodes a control signal exerting a first order control effect on said output electrode current flowing to said tuned network and on said reactive component of current for varying the operating frequency of said oscillator to maintain said beat-frequency signal at substantially said predetermined frequency.

2. A frequency-conversion apparatus comprising: an electron-discharge device having an anode electrode, a cathode electrode, a plurality of intermediate electrodes including an inner control electrode and an outer control electrode, and a shield electrode intermediate said control electrodes; an input circuit coupled to a pair of said electrodes for applying a wave signal thereto; an oscillator including said cathode electrode, said shield electrode, and said inner control electrode for developing local oscillations; a network tuned to approximately the frequency of said oscillations and coupled between said anode electrode and said shield electrode and coupled to said oscillator and responsive to the current flowing between said anode electrode and said shield electrode for supplying to said oscillator a reactive component of current; a network tuned to a predetermined intermediate frequency and coupled to said anode electrode and cathode electrode for translating a beat-frequency wave signal derived by said device; and a control system coupled to said last-mentioned network and to said cathode electrode and said outer control electrode and responsive to the frequency of said beat-frequency signal for deriving and applying between said last-mentioned electrodes a control signal exerting a first order control effect on said current flowing between said anode electrode and shield electrode and on said reactive component of current for varying the operating frequency of said oscillator to maintain said beat-frequency signal at substantially said predetermined frequency.

3. A frequency-conversion apparatus comprising: an electron-discharge device having an output electrode and a cathode electrode and a plurality of intermediate electrodes including an inner control electrode, a shield electrode, and an outer control electrode; an input circuit coupled to said outer control electrode and said cathode electrode for applying a wave signal thereto; an oscillator including said cathode electrode, shield electrode, and inner control electrode for developing local oscillations; a network tuned to approximately the frequency of said oscillations and coupled between said output electrode and said shield electrode and coupled to said oscillator and responsive to the current flowing between said output and said shield electrodes for supplying to said oscillator a reactive component of current; a network tuned to a predetermined intermediate frequency and coupled between said output electrode and said shield electrode for translating a beat-frequency wave signal derived by said device; and a control system including an input circuit coupled to said last-mentioned network and responsive to the frequency of said beat-frequency signal for deriving and applying between said cathode electrode and said outer control electrode a control signal exerting a first order control effect on said current flowing between said output electrode and said shield electrode and on said reactive component of current for varying the operating frequency of said oscillator to maintain said beat-frequency signal at substantially said predetermined frequency.

4. A frequency-conversion apparatus comprising: an electron-discharge device having an output electrode and a cathode electrode and a plurality of intermediate electrodes including an inner control electrode and an outer control electrode and a shield electrode there-between maintained at a point of fixed reference potential for alternating current; an input circuit coupled to a pair of said electrodes for applying a wave signal thereto; an oscillator including said cathode electrode, inner control electrode, and shield electrode for developing local oscillations; a network tuned to approximately the frequency of said oscillations and coupled between said output electrode and said point and coupled to said oscillator and responsive only to the current of said output electrode for supplying to said oscillator a reactive component of current; a network tuned to a predetermined intermediate frequency and coupled between said output electrode and said point for translating a beat-frequency wave signal derived by said device; and a control system coupled to said last-mentioned network and to said cathode electrode and said outer control electrode and responsive to the frequency of said beat-frequency signal for deriving and applying between said last-mentioned electrodes a control signal exerting a first order control effect on said output electrode current flowing to said tuned network and on said reactive component of current for varying the operating frequency of said oscillator to maintain said beat-frequency signal at substantially said predetermined frequency.

5. A frequency-conversion apparatus comprising: an electron tube having an anode electrode and a cathode electrode and a plurality of intermediate electrodes including an inner control electrode and an outer control electrode and including a first shield electrode between said inner and outer control electrodes and a second shield electrode between said anode and outer control electrodes, said shield electrodes being maintained at a point of fixed reference potential for alternating currents; an input circuit coupled to a pair of said electrodes for applying a wave signal thereto; an oscillator including said cathode electrode, inner control electrode, and shield electrode for developing local oscillations; a network tuned to approximately the frequency of said oscillations and coupled between said anode electrode and said point and inductively coupled to said oscillator and responsive only to the current of said output electrode for supplying to said oscillator a reactive component of current; a network tuned to a predetermined intermediate frequency and coupled between said anode electrode and said point for translating a beat-frequency wave signal derived by said tube; and a control system coupled to said last-mentioned network and to said cathode electrode and said outer control electrode and responsive to the frequency of said beat-frequency signal for deriving and applying between said last-mentioned electrodes a control signal exerting a first order control effect on said anode electrode current flowing to said tuned network and on said reactive component of current for varying the operating frequency of said oscillator to maintain said beat-frequency signal at substantially said predetermined frequency.

6. A frequency-conversion apparatus comprising: an electron-discharge device having an output electrode and a cathode electrode and a plurality of intermediate electrodes including an inner control electrode and an outer control electrode; an input circuit including a network tuned to a first frequency coupled to a pair of said electrodes for applying a wave signal thereto; an oscillator including a network tuned to a second frequency and coupled to said cathode electrode and inner control electrode for developing local oscillations; a network tuned to approximately the frequency of said oscillations and coupled between said output electrode and a point of fixed reference potential and inductively coupled to said oscillator and responsive only to the current of said output electrode for supplying to said oscillator a reactive component of current; a network tuned to a predetermined intermediate frequency and coupled between said output electrode and said point for translating a wave signal derived by said device having a frequency representing the beat frequency between said applied wave signal and said oscillations; and a control system coupled to said last-mentioned network and to said cathode electrode and said outer control electrode and responsive to the frequency of said beat-frequency signal for deriving and applying between said last-mentioned electrodes a control signal exerting a first order control effect on said output electrode current flowing to said tuned network and on said reactive component of current for varying the operating frequency of said oscillator to maintain said beat-frequency signal at substantially said predetermined frequency.

7. A frequency-conversion apparatus comprising: an electron-discharge device having an output electrode and a cathode electrode and a plurality of intermediate electrodes including an inner control electrode and an outer control electrode; an input circuit coupled to a pair of said electrodes for applying a frequency-modulated wave signal thereto having a predetermined deviation range; an oscillator including said cathode electrode and inner control electrode for developing local oscillations; a network tuned to approximately the frequency of said oscillations and coupled between said output electrode and a point of fixed reference potential and coupled to said oscillator and responsive only to the current of said output electrode for supplying to said oscillator a reactive component of current, said network including a damping means providing for said network a bandwidth several times said deviation range; a network tuned to a predetermined intermediate frequency and coupled to said output electrode and said cathode electrode for translating a frequency-modulated beat-frequency wave signal derived by said device; and a control system coupled to said last-mentioned network and to said cathode electrode and said outer control electrode and responsive to the frequency modulation of said beat-frequency signal for deriving and applying between said last-mentioned electrodes a control signal exerting a first order control effect on said output electrode current flowing to said tuned network and on said reactive component of current for varying the operating frequency of said oscillator to maintain the center frequency of said beat-frequency signal at substantially said predetermined frequency.

8. A frequency-conversion apparatus comprising: an electron-discharge device having an output electrode and a cathode electrode and a plurality of intermediate electrodes including an inner control electrode and an outer control electrode; an input circuit coupled to a pair of said electrodes for applying a wave signal thereto; an oscillator including said cathode electrode and inner control electrode for developing local oscillations; a point of fixed reference potential; a first network tuned to approximately the frequency of said oscillations and coupled between said output electrode and said point of reference potential and inductively coupled to said oscillator and responsive only to the current of said output electrode for supplying to said oscillator a reactive component of current; a second network tuned to a predetermined intermediate frequency and coupled between said first network and said point of reference potential for translating a beat-frequency wave signal derived by said device; and a control system coupled to said second network and to said cathode electrode and said outer control electrode and responsive to the frequency of said beat-frequency signal for deriving and applying between said last-mentioned electrodes a control signal exerting a first order control effect on said output electrode current flowing to said tuned network and on said reactive component of current for varying the operating frequency of said oscillator to maintain said beat-frequency signal at substantially said predetermined frequency.

9. A frequency-conversion apparatus comprising: an electron-discharge device having anode and cathode electrodes and a plurality of intermediate electrodes including an inner control electrode, a shield electrode maintained at a point of fixed potential for alternating current, and an outer control electrode; an input circuit coupled to said outer control electrode and said cathode electrode for applying a frequency-modulated wave signal thereto having a predetermined deviation range; an oscillator including said cathode electrode, said shield electrode, and said inner control electrode for developing local oscillations; a network tuned to approximately the frequency of said oscillations and coupled between said anode and said shield electrodes and inductively coupled to said oscillator and responsive to the current flowing between said anode and shield electrodes of said device for supplying to said oscillator a reactive component of current, said network including damping means providing for said network a bandwidth several times said deviation range; a network tuned to a predetermined intermediate frequency and coupled to said anode and said cathode electrodes and responsive to said current flowing between said anode and shield electrodes for translating a frequency-modulated beat-frequency wave signal derived by said device; and a control system coupled to said last-mentioned network and to said cathode electrode and said outer control electrode and responsive to the frequency modulation of said beat-frequency signal for deriving and applying between said last-mentioned electrodes a control signal exerting a first order control effect on said current flowing between said anode and shield electrodes and on said reactive component of current for varying the operating frequency of said oscillator to maintain the center frequency of said beat-frequency signal at substantially said predetermined frequency.

10. A frequency-conversion apparatus comprising: an electron-discharge device having a cathode, an inner control electrode for controlling cathode current, a pair of output electrodes, and an outer control electrode for controlling the difference in current flowing to said output electrodes from said cathode; an input circuit coupled to one of said control electrodes and said cathode for applying a wave signal thereto; an oscillator including said cathode and inner control electrode for developing local oscillations; a network tuned to approximately the frequency of said oscillations and coupled to one of said output electrodes and said cathode and coupled to said oscillator and responsive to said difference in current for supplying to said oscillator a reactive component of current; a network tuned to a predetermined intermediate frequency and coupled to one of said output electrodes and said cathode for translating a beat-frequency wave signal derived by said device; and a control system coupled to said last-mentioned network and to said cathode and said outer control electrode and responsive to the frequency of said beat-frequency signal for deriving and applying between said last-mentioned electrodes a control signal exerting a first order control effect on said difference in current and on said reactive component of current for varying the operating frequency of said oscillator to mantain said beat frequency at substantially said predetermined frequency.

References Cited in the file of this patent

UNITED STATES PATENTS

| | | |
|---|---|---|
| 2,033,986 | Harris | Mar. 17, 1936 |
| 2,122,283 | Harris | June 28, 1938 |
| 2,194,512 | Travis | Mar. 26, 1940 |
| 2,200,038 | Mountjoy | May 7, 1940 |
| 2,256,067 | Van Slooten | Sept. 16, 1941 |
| 2,540,532 | Koch | Feb. 6, 1951 |
| 2,593,349 | Seright | Apr. 15, 1952 |
| 2,616,036 | Adler | Oct. 28, 1952 |